United States Patent [19]

Weaver et al.

[11] Patent Number: 5,786,696

[45] Date of Patent: Jul. 28, 1998

[54] METAL DETECTOR FOR IDENTIFYING TARGET ELECTRICAL CHARACTERISTICS, DEPTH AND SIZE

[75] Inventors: Brent Charles Weaver; Robert J. Podhrasky; Ayaz Nemat, all of Dallas, Tex.

[73] Assignee: Garrett Electronics, Inc., Garland, Tex.

[21] Appl. No.: 859,457

[22] Filed: May 20, 1997

Related U.S. Application Data

[62] Division of Ser. No. 541,034, Oct. 6, 1995, Pat. No. 5,721,489.

[51] Int. Cl.$^6$ .................... G01V 3/11; G01V 3/165; G01V 3/38
[52] U.S. Cl. .................... 324/329; 324/233; 324/243
[58] Field of Search .................... 324/326–329, 324/334, 239–243

[56] References Cited

U.S. PATENT DOCUMENTS

| | | | |
|---|---|---|---|
| 3,337,796 | 8/1967 | Hentschel et al. | 324/40 |
| 3,391,336 | 7/1968 | Hentschel | 324/40 |
| 3,405,354 | 10/1968 | Callan et al. | 324/40 |
| 3,471,772 | 10/1969 | Smith | 324/3 |
| 3,644,825 | 2/1972 | Davis, Jr. et al. | 324/41 |
| 3,665,449 | 5/1972 | Elder et al. | 340/280 |
| 3,676,772 | 7/1972 | Lee | 324/41 |
| 3,686,564 | 8/1972 | Mallick, Jr. et al. | 324/41 |
| 3,758,849 | 9/1973 | Susman et al. | 324/41 |
| 3,763,424 | 10/1973 | Bennett, Jr. et al. | 324/41 |
| 3,875,498 | 4/1975 | Mahan et al. | 324/3 |
| 4,016,486 | 4/1977 | Pecori | 324/3 |
| 4,024,468 | 5/1977 | Hirschi | 324/3 |
| 4,030,026 | 6/1977 | Payne | 324/3 |
| 4,099,116 | 7/1978 | Tyndall | 324/3 |
| 4,110,679 | 8/1978 | Payne | 324/3 |
| 4,128,803 | 12/1978 | Payne | 324/3 |
| 4,249,128 | 2/1981 | Karbowski | 324/329 |
| 4,263,553 | 4/1981 | Cook et al. | 324/327 |
| 4,300,097 | 11/1981 | Turner | 324/329 |
| 4,303,879 | 12/1981 | Podhrasky | 324/329 |
| 4,325,027 | 4/1982 | Dykstra et al. | 324/329 |
| 4,344,034 | 8/1982 | Randolph, Jr. | 324/329 |
| 4,470,015 | 9/1984 | Hirschi et al. | 324/329 |

(List continued on next page.)

OTHER PUBLICATIONS

Smith, Don E., "An Investigation of an Induction Field Ranging Method," A Thesis in Electrical Engineering, Jun. 1968.

*Primary Examiner*—Gerard R. Strecker
*Attorney, Agent, or Firm*—Sidley & Austin

[57] ABSTRACT

A metal detector utilizes digital signal processing and a microprocessor to process buffers of information which is received at a periodic rate. Both high and low gain phase quadrature and in-phase signals are provided via a multiplexer to an analog-to-digital converter from a first receive antenna. A second receive antenna provides phase quadrature and in-phase signals also through the multiplexer to the analog-to-digital converter. The received signals are averaged, decimated and low pass filtered to eliminate noise and reduce the quantity of data which must be processed. A threshold (triggering) processing operation is performed to determine whether a valid target signal is present in the data. If not, no further processing is performed. The in-phase and quadrature components are processed using Fourier transforms to select a frequency band which includes the energy for the target signal. The energy in this frequency band is utilized to determine the identification of the target. The depth of the target is determined by comparing the quadrature phase components received from the first and second receive antennas. The size of the target is determined by reference to a look-up table based on the depth factor and the signal amplitude determined for the target object A display screen has a plurality of horizontal depth symbols, each of which has a plurality of size indicators and upon determining the depth and size of a target, one depth symbol is activated together with one of the size indicators to concurrently display this information to an operator.

3 Claims, 11 Drawing Sheets

U.S. PATENT DOCUMENTS

| | | | |
|---|---|---|---|
| 4,486,713 | 12/1984 | Gifford | 324/329 |
| 4,507,612 | 3/1985 | Payne | 324/329 |
| 4,514,692 | 4/1985 | Johnson et al. | 324/329 |
| 4,659,989 | 4/1987 | Kerr | 324/233 |
| 4,677,384 | 6/1987 | Payne | 324/329 |
| 4,700,139 | 10/1987 | Podhrasky | 324/329 |
| 4,709,213 | 11/1987 | Podhrasky | 324/329 |
| 4,783,630 | 11/1988 | Shoemaker | 324/329 |
| 4,868,910 | 9/1989 | Maulding | 324/233 |
| 4,894,618 | 1/1990 | Candy | 324/329 |
| 4,896,116 | 1/1990 | Nagashima et al. | 324/329 |
| 4,949,037 | 8/1990 | Abe | 324/233 |
| 5,148,151 | 9/1992 | Podhrasky | 340/572 |
| 5,406,259 | 4/1995 | Manneschi | 340/561 |
| 5,414,411 | 5/1995 | Lahr | 340/568 |
| 5,506,506 | 4/1996 | Candy | 324/329 |
| 5,525,907 | 6/1996 | Frazier | 324/329 X |
| 5,576,624 | 11/1996 | Candy | 324/329 |

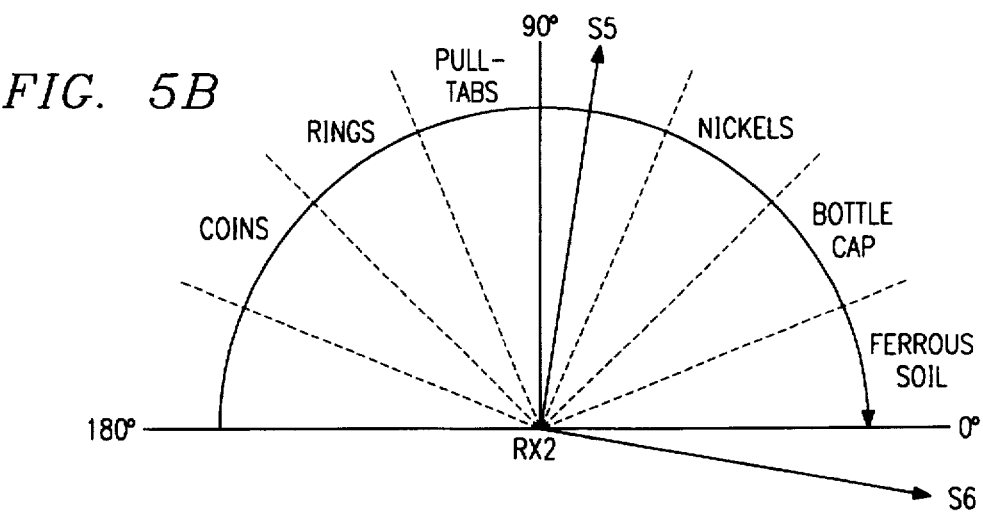
FIG. 5B
FIG. 6
150 SIZE TABLE
|  | Size A | Size B | Size C | Size D | Size E |
|---|---|---|---|---|---|
| 1" | 0 | 2551 | 10204 | 71429 | 1,000,000 |
| 2" | 0 | 1276 | 5102 | 35714 | 500,000 |
| 3" | 0 | 639 | 2551 | 17857 | 250,000 |
| 4" | 0 | 319 | 1275 | 8929 | 125,000 |
| 5" | 0 | 159 | 638 | 4464 | 62500 |
| 6" | 0 | 80 | 319 | 2232 | 31250 |
| 7" | 0 | 40 | 159 | 1116 | 15625 |
| 8" | 0 | 20 | 80 | 558 | 7812 |
| 9" | 0 | 10 | 40 | 279 | 3906 |
| 10" | 0 | 5 | 20 | 140 | 1953 |
| 11" | 0 | 2 | 10 | 70 | 977 |
| 12" | 0 | 1 | 5 | 35 | 488 |
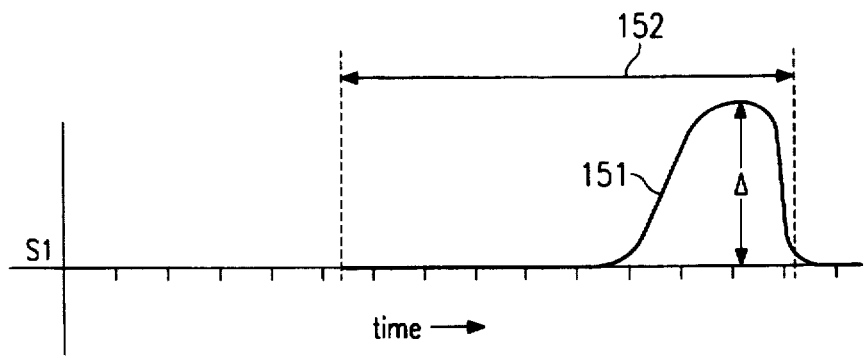
FIG. 7

METAL DETECTOR FOR IDENTIFYING TARGET ELECTRICAL CHARACTERISTICS, DEPTH AND SIZE

CROSS REFERENCE TO RELATED APPLICATIONS

This is a division of U.S. Pat. application Ser. No. 08/541,034 filed Oct. 6, 1995, now U.S. Pat. No. 5,721,489.

TECHNICAL FIELD OF THE INVENTION

The present invention pertains in general to metal detectors, and in particular to metal detectors which measure and indicate characteristics of the target.

BACKGROUND OF THE INVENTION

It has been well established in the metal detector industry that targets can be identified based upon their physical composition due to phase characteristics of receive signals produced when the target object is in the field of the transmit and receive coils. It has further been established that the effect of mineralized soil, which can produce a ground component signal, can be minimized by processing techniques which recognize the different frequency response characteristics of a target and the ground. Dual receiver antenna designs have also been suggested as a possible technique for determining distance to a target. Despite these advances, however, there exists a need for better methods of processing data to extract information about the target signal and to determine the actual size of the target which has been detected. The present invention provides for improved identification of the physical composition of the target, reduced incidence of false alarms, the depth of the target and concurrent identification of the size of the target.

SUMMARY OF THE INVENTION

A selected aspect of the present invention comprises a method for detecting the presence of a target signal within a received signal of a metal detector. A Fourier component of a quadrature phase target signal is examined with certain requirements to determine the existence of a target signal. The portion of the Fourier signal which meets these requirements establishes a frequency range that represents the energy of the target signal. The same frequency range is examined for the in-phase signal component to select the target information from that phase component. These signal components are ratioed to determine the electrical or conductive characteristics (ID) of the target.

In a further aspect of the present invention, a preliminary examination of signals, in the generation of a new vector, is used to determine if there is a likelihood that the presently received, and buffered, signal data includes a target signal. The new vector comprises a combination of the in-phase and quadrature phase components of a first receive coil signal. Both the quadrature phase component of the receive signal and the new vector signal are processed through a high pass window filter and these signals are multiplied to get a product. This product is compared to a threshold value as well as polarity requirements to determine if a target signal is present and further processing of the data sorted in the buffer should be performed.

In a still further aspect of the present invention, the size of a target object is determined after the identification of the target, the depth and the amplitude of the target signal has been determined by processing. These factors are entered into a look-up table which identifies a size classification for the object.

In a still further aspect of the present invention, a unique display for a metal detector indicates concurrently the size and depth of a target. A plurality of depth symbols are arrayed vertically with horizontal elongated elements. Each of the depth symbols includes a plurality of size indicators. When a target is determined to exist, a corresponding depth symbol is activated (illuminated) and one of the size indicators within the depth symbol is also illuminated so that the operator is presented with information in a graphic form showing the size and depth of the target.

BRIEF DESCRIPTION OF THE DRAWINGS

For a more complete understanding of the present invention and the advantages thereof, reference is now taken to the following description taken in conjunction with the accompanying drawings in which:

FIGS. 5A and 5B represent the vector signals produced by the RX1 and RX2 receive coils for the detector shown in FIG. 1, together with the vector responses for selected target objects.

FIG. 6 is a table which determines a classification size for a target detected by a metal detector based on the determined depth of the target and the amplitude of the target signal.

FIG. 7 is a further illustration of the S1 signal produced by the RX1 coil with a pulse produced by a target.

DETAILED DESCRIPTION

Figure 1:
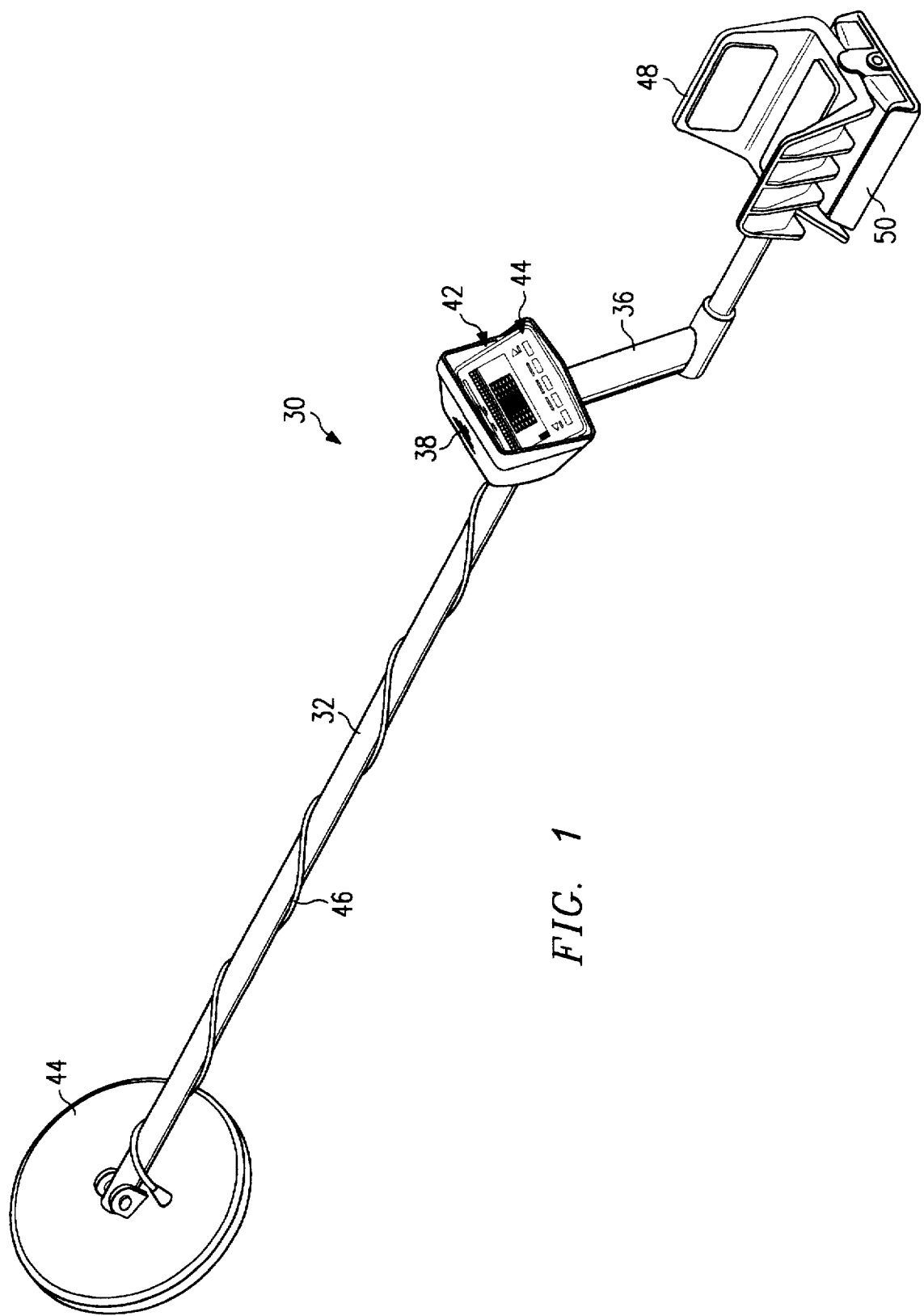
FIG. 1 is a perspective view of a hand-held metal detector which incorporates the features of the present invention.

Referring to FIG. 1, there is illustrated a hand-held metal detector 30 which is typically used by hobbyists in searching for metal objects which are generally out of sight and typically buried a short distance beneath the surface of the earth. The detector 30 includes a stem section 32, a hand grip 36 and a housing 38 which includes electronic detection circuitry, further described below, together with a display 42 and an operator touch pad 44. The detector 30 further includes a search head 44 which includes transmit and receive coils that are connected via a cable 46 to the electronics package 38. The cable can extend through the stem 32. The detector 30 includes an arm rest 48 and a battery pack 50.

A detector of the general type shown in FIG. 1 is described in U.S. Pat. No. 5,148,151 entitled "Metal Detector Having Target Characterization and Search Classification" which issued on Sep. 15, 1992. This patent is incorporated herein by reference.

Figure 2:
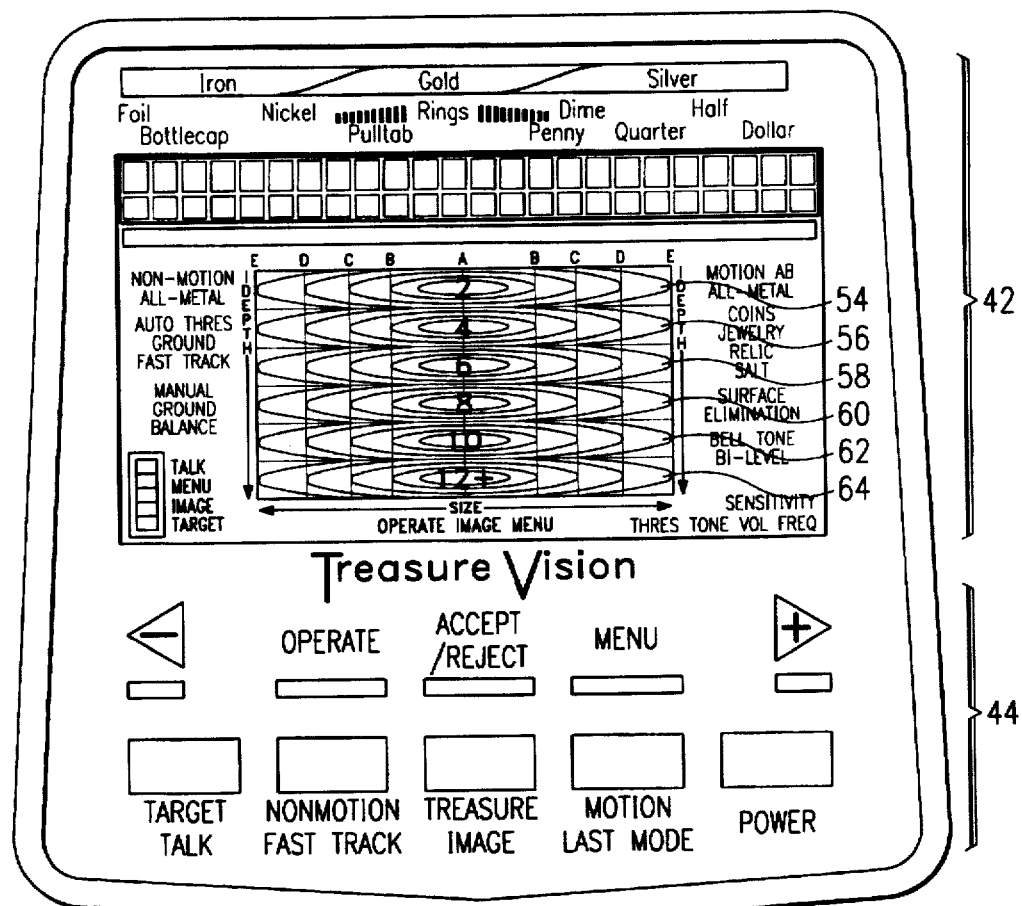
FIG. 2 is a display screen where the detector shown in FIG. 1 with the screen illustrating the approximate size and depth of target objects.

Referring to FIG. 2, there is shown the display 42 and touch pad 44, which comprises an integral unit. The display 42 includes a graphic display for indicating the depth and the size of a target object which has been detected by the metal detector 30. The depth of the target is indicated by illumination of one of the six vertically stacked depth symbols which are identified as symbols 54, 56, 58, 60, 62 and 64. The shallowest depth symbol is 54 and the deepest depth symbol is 64. In a typical scaling, the symbols 54 through 62 indicate two-inch intervals and the symbol 64 indicates a depth of twelve inches or greater.

Within each of the depth symbols 54–64, there are size indicators across the top scale as A, B, C, D and E. Each of the size indicators is an ellipse and all of the ellipses have a common center. The activation of indicator A shows the smallest size target while the activation of indicator E shows the largest size target. The size scale is set forth as follows:

Size A—Smaller than a coin.

Size B—Coin size.

Size C—Larger than coins up to small belt buckles, such as pull-tabs and bottle caps.

Size D—Small belt buckles up to aluminum drink cans.

Size E—Anything bigger man an aluminum can, such as a kettle.

The touch pad 44 shown in FIG. 2 provides operator control for the metal detector 30. This includes power on/off, target characterization for accepting and rejecting and a menu of selectable items for operation.

Target Talk is selected for speech on demand for the last registered target. Non-Motion is an operating mode which does not require motion, that is, for static operation. Fast Track is an automatic ground balancing operation. Treasure Image, press and hold, is for pinpoint detection. This gives true size and depth, with no motion. Motion is the most typically used mode for the features described herein. Last Mode reverts the detector to the previously selected mode.

In accordance with the present invention, when the metal detector 30 has detected a target, there will be produced on the display 42 an illumination of one of the size ellipses A through E on one of the depth symbols so that the operator is provided with an indication of the depth of the detected target as well as the approximate size of the target. This information is determined by the process of the detected signals from the target as described herein.

A further metal detector patent using signal processing for discrimination of targets is U.S. Pat. No. 4,700,139 entitled "Metal Detector Circuit Having Selectable Exclusion Range for Unwanted Objects" which was issued on Oct. 13, 1987. The patent is incorporated herein by reference. A still further patent which discloses digital signal processing for a metal detector is U.S. Pat. No. 4,709,213 entitled "Metal Detector Having Digital Signal Processing" which was issued on Nov. 24, 1987. This patent is incorporated herein by reference.

Figure 3:
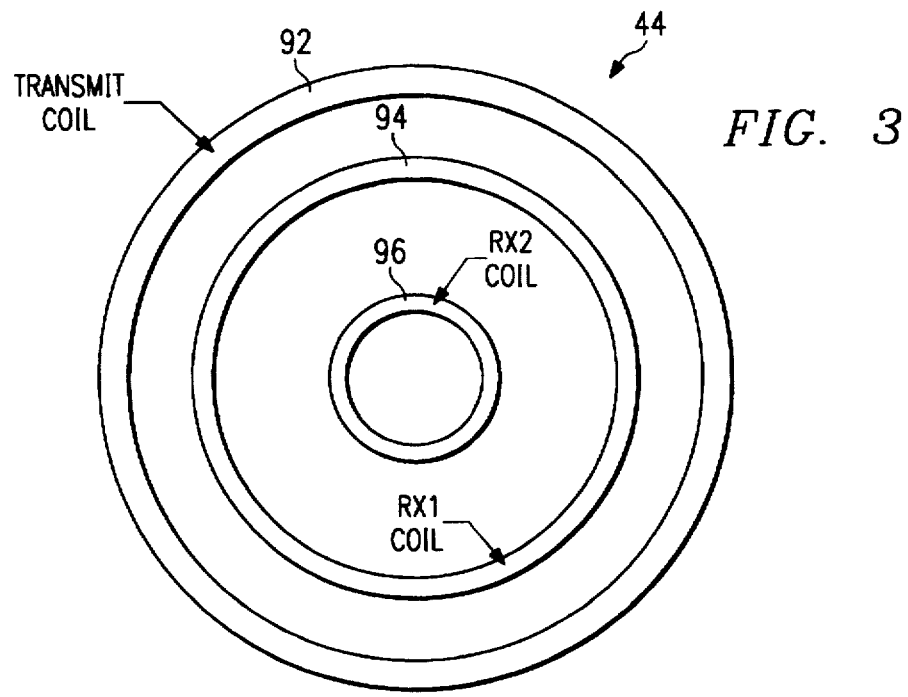
FIG. 3 is an illustration of the single transmit coil and two receive coils of the detector shown in FIG. 1.

The search coil 44, shown in FIG. 1, is illustrated in further detail with the coil configuration shown in FIG. 3. The search head 44 includes a transmit coil 92 and two receive coils 94 and 96 which are respectively identified as the RX1 coil and the RX2 coil. The receive coils RX1 and RX2 are offset from each other. In a preferred embodiment, the receive coils 94 and 96 are coaxial. The transmit coil 92 is coaxial with the receive coils 94 and 96 and may be either coplanar with the receive coils or offset somewhat. Each of the receive coils is inductively balanced with the transmit coil. As a result, when the transmit coil receives a steady sinusoidal signal, there is essentially no output signal produced from the receive coils 94 and 96 when there is no target in the vicinity of the coils. However, when a conductive or inductive target or mineralized soil is in the vicinity of the coils 92, 94 and 96, the coil coupling is unbalanced and a signal is produced in one or more of the receive coils 94 and 96 in a manner that is well known in the industry. In a selected embodiment, the transmit coil has a diameter of approximately 8.5 inches, the receive coil 94 (RX1) has a diameter of approximately 5.5 inches and the receive coil 96 (RX2) has a diameter of approximately 2.5 inches.

Figure 4:
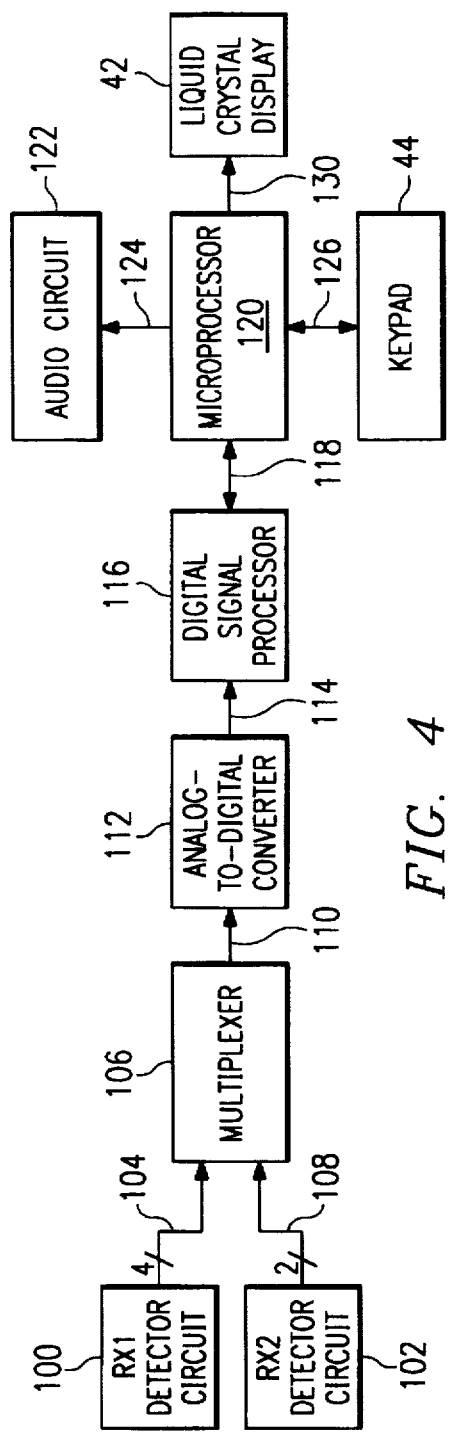
FIG. 4 is a block diagram of the electronic circuits in the detector shown in FIG. 1.

A block diagram of the electronics for the metal detector 30, shown in FIG. 1, is illustrated in FIG. 4. The RX1 receive coil is connected to an RX1 detector circuit 100 and the RX2 receive coil 96 is connected to an RX2 detector circuit 102. The circuits 100 and 102 are phase detector circuits such as shown in U.S. Pat. No. 4,700,139 and U.S. Pat. No. 4,709,213 which have been incorporated herein by reference.

The detector circuit 100 produces four different signals which are transmitted through a multi-conductor line 104 to a multiplexer 106. The detector circuit 102 produces two signals which are transmitted through a multi-conductor line 108 to the multiplexer 106. The terminology for the signals produced by each of the circuits 100 and 102 is listed as follows:

S1L—RX1 coil phase quadrature signal low gain

S1H—RX1 coil phase quadrature signal high gain

S4L—RX1 coil in-phase signal low gain

S4H—RX1 coil in-phase signal high gain

S5—RX2 coil phase quadrature signal

S6—RX2 coil in-phase signal

The multiplexer 106 cycles through the six signals from the circuits 100 and 102 and provides each one sequentially through a line 110 to an analog-to-digital converter 112. The six analog signals noted above are converted to digital words, preferably having 16 bits, and sequentially are provided through a digital bus 114 to a digital signal processor 116. A selected embodiment of the digital signal processor 116 is a model ADSP-2103 manufactured by Analog Devices. The operation of the digital signal processor 116 is described in detail in reference to FIGS. 17A–17F below.

The digital signal processor 116 is connected through a bidirectional bus 118 to a microprocessor 120. The operation of the microprocessor 120 is described below in reference to FIGS. 18A–18B. A selected embodiment of the microprocessor 120 is a model 68HC705C8 manufactured by Motorola.

The microprocessor 120 drives an audio circuit 122 for producing selected audio responses when targets are detected or other conditions occur in the metal detector 30. The microprocessor 120 is connected to the audio circuit 122 via a line 124.

The microprocessor 120 is connected via a bidirectional bus 126 to the keypad 44 for providing operator input into the metal detector 30.

The microprocessor 120 is connected through a line 130 to the liquid crystal display 42, which is shown in FIG. 2.

Figure 5A:
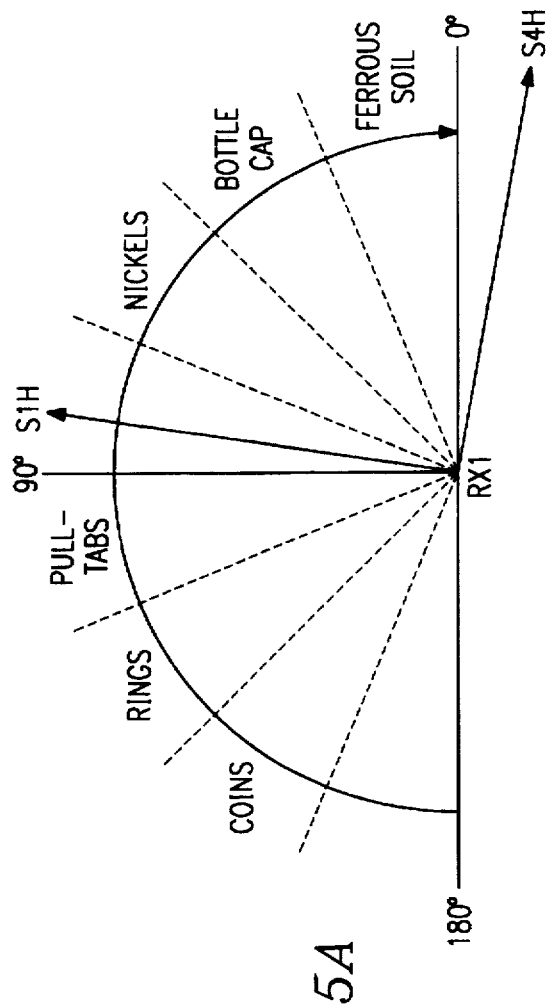

Referring now to FIG. 5A, there are shown two of the signals produced by the receive coil RX1. These are S1H and S4H. The low gain signals S1L and S4L are located at the same angular positions. The vector diagrams shown in FIG. 5A and 5B illustrate responses from targets and other objects in-phase relation to the transmitted signal. The S4H signal is approximately in-phase with the transmitted signal and the S1H is in approximate quadrature phase with the transmitted phase. As can be seen, ferrous soil produces a response which is very close to the in-phase signal. Other targets have gradually increasing quadrature phase components as shown by bottle cap, nickels, pull-tab, rings and coins. In a preferred embodiment, the S1H signal may be almost exactly in-phase quadrature or may be slightly offset as shown. Likewise, the S4H signal may be almost exactly in-phase or slightly offset as shown.

Referring to FIG. 5B, the signals from coil RX2 are shown as vectors. The in-phase component S6 is slightly offset from being exactly in-phase with the transmitted signal and the quadrature phase component S5 is shown as being slightly offset from a quadrature component, although each of these signals may be nearly exactly the phase of the corresponding in-phase or quadrature component.

The S1H signal has been amplified to a higher level than the S1L signal but has the same phase characteristic. This is true for the S4H and S4L signals as well. This provides for a greater dynamic range. In general, when the high gain signal (H) is in saturation, the low signal will be used. However, if the high signal is not in saturation, it will be used.

A table 150 which is utilized by the microprocessor 120, shown in FIG. 4, for determining the approximate size of a detected target is shown in FIG. 6. There are two input values to this table. These are target depth, which is shown at the left side of the table, and a target signal amplitude value which are the entries shown in the matrix cells of the table 150. The output from the table 150 is a size indication which is shown as sizes A, B, C, D and E along the top. These are the same size indicators that are shown in display 42 in FIG. 2. The numbers inside each cell represent approximately the normalized lower boundary of the amplitude for each size. The numbers are normalized, approximate relative values.

Referring to FIG. 4, the analog-to-digital converter 112 produces a set of the six signals S1L, S1H, S4L, S4H, S5 and S6 5,000 times per second and these are decimated to 128 per second by the DSP 116. A buffer of approximately one-half second of data is maintained and processed. Each time a new set of samples is received, the oldest samples in the buffer are deleted and the newest set of samples are added to create a new buffer of information for processing.

In a brief overview, the signal processing carried out by the metal detector 30 digital signal processor and microprocessor is as follows. When each new set of data is received, that is, 128 times per second, the data in the buffer is examined to determine if it meets certain requirements that indicate the presence of a target signal. If these requirements are not met, the data is not processed and no response signals are produced. New data is awaited to update the information in the buffer. If the preliminary examination of the data in the buffer indicates the presence of a target signal, then a sequence of operations is carried out to process the data for determining the approximate size and approximate depth of the target. A Fourier transform operation is used to determine if a target signal is present in the S1 signal. If such a signal is present, the frequency band of the signal is determined. The same frequency band is examined for a Fourier transform of the S4 signal and the energy in this band is extracted. A ratio of these signals is produced to determine the electrical or conductive characteristic of the target, and this is referred to as a target ID. In addition, the S1 and S5 signal strengths are determined and compared as a ratio to determine target depth. The determined target depth is selected as the first factor for the table 150 and the determined target signal amplitude is entered as the second factor for the table. By entry of these two factors, a resulting approximate size indication from A-E is determined. The depth and size indications are then sent to the liquid crystal display 42 which activates the appropriate depth symbol and size indicator on that depth symbol to indicate to the operator the approximate depth and size of the target object. This processing is described in detail below.

A significant feature of the present invention is termed "adaptive processing." It is well known that mineralized soil produces a signal component that is approximate in-phase with the transmitted signal. A desired target typically has a quadrature phase component and mineralized soil typically does not produce such a component. However, in order to determine the electrical characteristic of the target for identification purposes, it is necessary to know both the quadrature and the in-phase components of the target signal. A metal detector, such as detector 30 shown in FIG. 1, is used by the operator by swinging it back and forth with the detector head 44 close to the surface of the ground. Thus, there is relative motion between the search head 44 and a target. Mineralized soil is generally uniformly distributed over the search area. Thus, the target signal will have a higher frequency response than the undesired mineralized soil signal.

Figure 10:
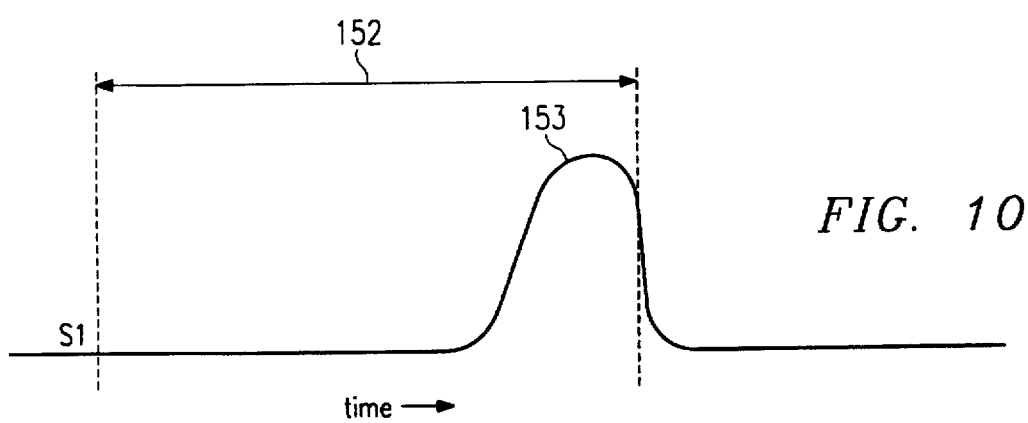
FIG. 10 is an illustration of the S1 signal which is received by the RX1 receive coil and includes a pulse produced by a target.

A target pulse on the quadrature channel S1 is shown in FIG. 7. The target pulse is represented by the reference numeral 151. FIG. 10 is a further illustration of the S1 signal which is received by the RX1 receive coil and includes a pulse 153 produced by a target. As noted above, the metal detector 30 samples at a rate of 128 hertz and stores approximately 60 sets of samples which cover a time period of approximately one-half second. Thus, there is a "window" of data stored for processing at any one time. As shown in FIG. 7 and in FIG. 10, a window 152 of time is indicated by the bidirectional arrows. Each 128ths of a second, the window 152 progresses one data sample set forward in time and deletes the oldest sample set. As shown in FIG. 7, the window 152 has received a substantial portion of the target signal pulse 151. The signal S1, as well as the other five signals have all been digitized and stored in a buffer for the period of the time window 152.

When each buffer of data has been collected, the first step is to make a threshold determination of whether or not a target signal is present. This is now described in reference to FIGS. 7, 8, 9 and flow diagram FIGS. 17A and 17B. This is a "trigger" determination.

Figures 17A, 17B:
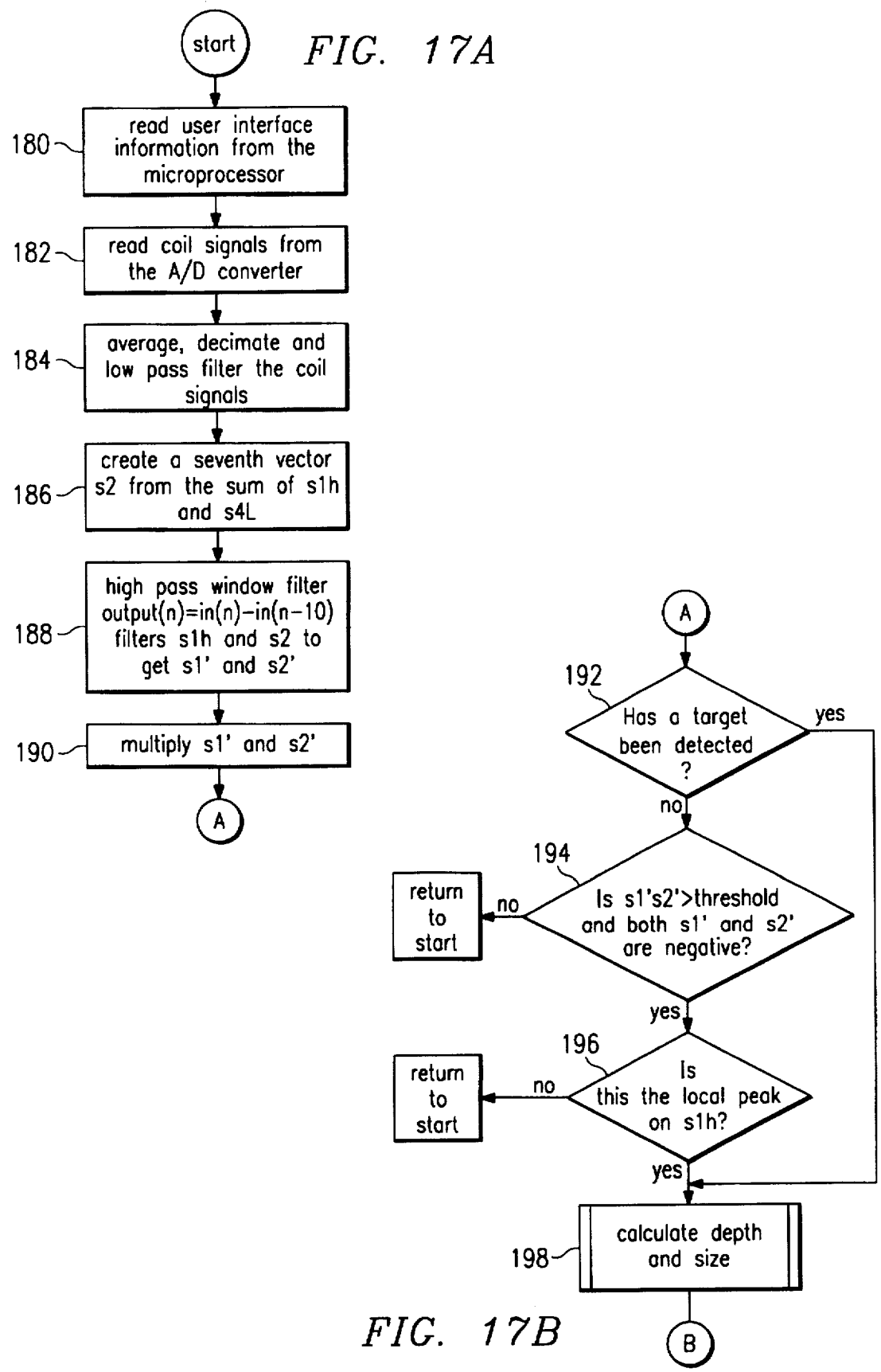
FIGS. 17A–17F comprise a flow diagram describing the detailed operation of the digital signal processor (DSP) shown in FIG. 4 and which comprises a component of the electronics of the metal detector described in the present application, and FIGS. 18A–18B comprise a flow diagram describing the operation of the microprocessor shown in FIG. 4 and which is included within the metal detector described herein.

Referring to FIG. 17A, the digital signal processor 116 begins operation at the start bubble by entering operational block 180. Within this block, the digital signal processor reads the user interface information that is supplied to it from the microprocessor and has been entered by the user into the microprocessor. This information establishes parameters for target searching. From block 180, the operation transfers to operational block 182 for reading the received coil signals provided by the analog-to-digital converter 112. Control is then transferred to operational block 184.

Within block 184, the digital signal processor 116 averages a group of continuous samples to produce an average sample value. Each of the six signals noted above is sampled at a rate of approximately five kilohertz. Approximately forty samples are averaged to produce a single resulting sample and these resulting samples occur at a rate of 128 hertz. The resulting averaged signal is low pass filtered to eliminate high frequency noise components. The cutoff for high frequency components is approximately 64 hertz.

From block 184, control is transferred to block 186 in which the processor 116 creates a seventh vector, which is termed S2. It is the sum of portions of the S1H and S4L vector signals. This summation is done on a point-by-point basis. Control is then transferred to operational block 188.

Figure 8:
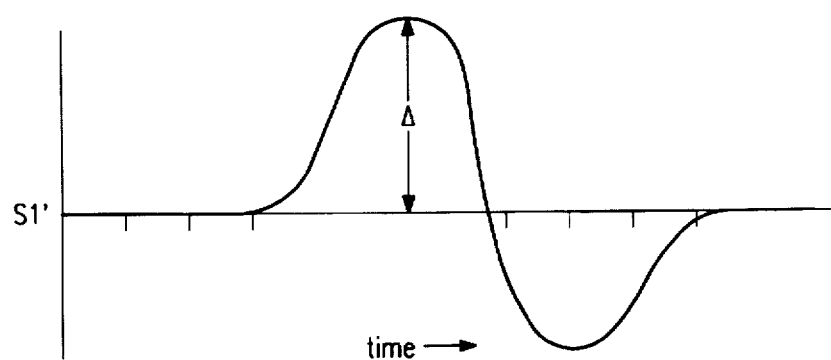
FIG. 8 is an illustration of a signal S1' which is produced by use of a high pass window filter for the S1 signal shown in FIG. 7.

Within block 188, a window filtering operation is performed on the S1H signal and on the S2 signal to produce filtered signals which are termed S1' and S2'. This is shown in reference to FIGS. 7 and 8. The S1 signal in FIG. 7 has a target pulse with an amplitude of A. The window filtering performs a type of high pass filtering that preserves the full amplitude of the target signal Each signal value has subtracted from it the signal value that occurred ten samples earlier. As noted above, each sample occurs 128 times per second. As shown in FIG. 7, the signal value is zero until the signal pulse is encountered. Thus, when the older signal is subtracted from the newer signal, the result is the production of a signal S1' which has essentially the same shape as the original signal pulse. This is shown in FIG. 8. The result of this window filtering is the elimination of the DC component of the signal. As shown in FIG. 8 there will be some rebound as a result of this filtering, but this can be ignored in the signal processing. The S2 signal, noted above, is similarly processed using a high pass window filter to produce a signal termed S2'. Control is then transferred to operational block 190.

Figure 9:
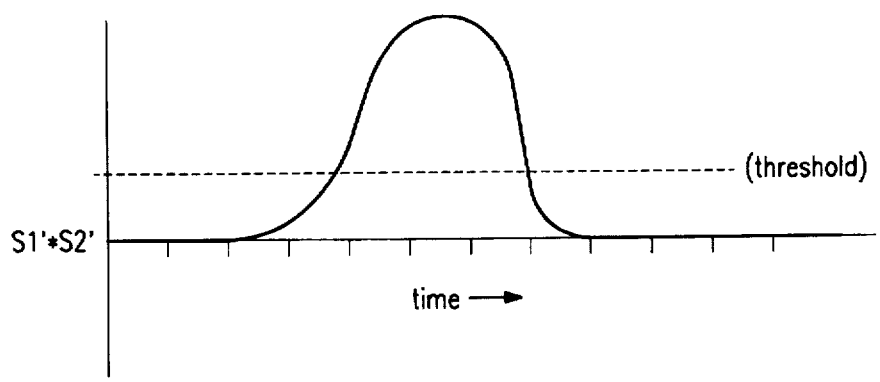
FIG. 9 is an illustration of the wave form which comprises the product of the S1' and S2' signals and is compared to a threshold for producing a trigger state.

Within block 190, the signals S1' and S2' are multiplied by each other to produce a result which is shown in FIG. 9. Control is then transferred to question block 192 in FIG. 17B.

In question block 192, a flag is checked to determine if a target has previously been detected. If this flag has not been set, control is transferred to question block 194. If the flag is set, control is transferred directly to operational block 198.

In question block 194, a comparison is made to determine if the product signal of S1' and S2' exceeds a preset threshold, this is shown in FIG. 9. A further inquiry is made to determine if both the S1' and S2' signals are negative. Both of these signals must be negative in order to have a valid target.

The signals shown in the various wave forms are expressed as positive signals for ease of understanding but in an actual implementation as described will be negative.

If the S1' and S2' signals meet both of the requirements set forth in question block 194, the yes exit is taken to a question block 196. Within block 196, a determination is made as to whether a local peak has been reached for the S1 signal. The peak is determined when one sample has two preceding values and two succeeding values that are both less in amplitude. This is five point peak detection. This inquiry is made to determine if a sufficient amount of the target signal has been acquired to initiate the processing of the target signals. If this requirement is also met, control is transferred to the operational block 198.

If the requirements of either block 194 or block 196 are not met, the no exit are taken and control is returned to the start in FIG. 17A.

The transfer to the yes exit of block 196 is a confirmation that a viable target signal has been detected and that processing should be initiated to determine the size and depth of the target. As noted, if these requirements for such a designation are not met, the processing is not carried out for determining size and depth of the target. By performing this preliminary analysis and establishing a "trigger" requirement, it is less likely that the ultimate processing will inadvertently result in generating a target signal that could likely be based on noise or other unintended signals. Thus, this increases the reliability of the detection signals produced by the metal detector 30 to the operator.

Figure 11:
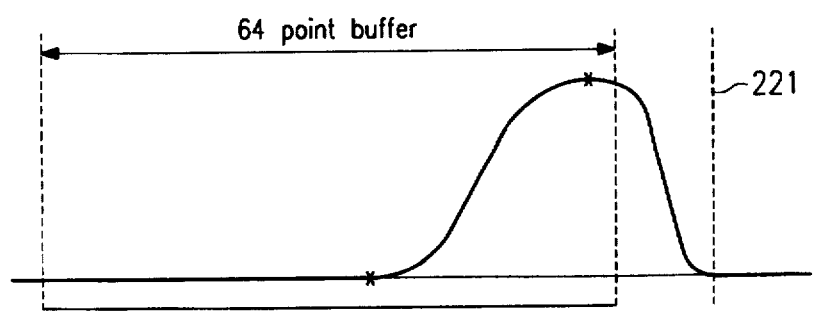
FIG. 11 is an illustration of a target signal, such as S1, which has been stored in a 64 point buffer.
Figure 16:
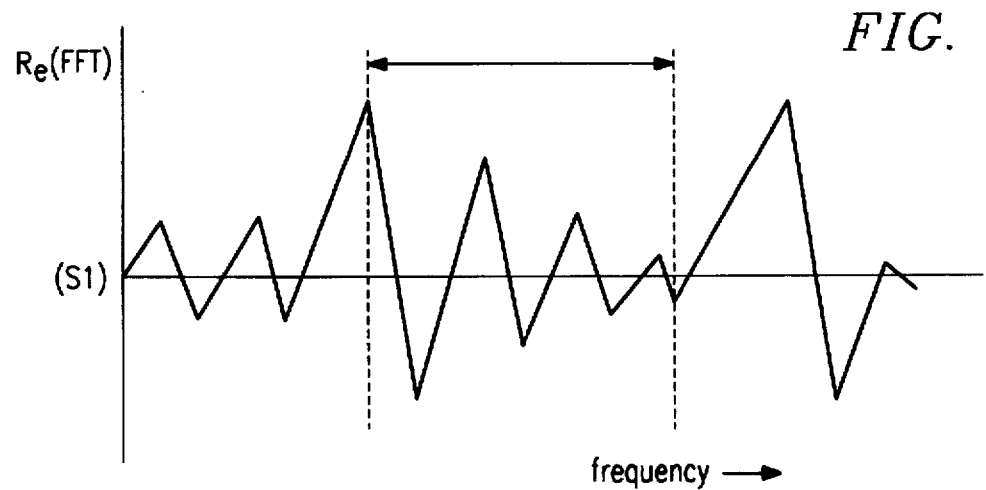
FIG. 16 is a further example of the real component of the Fourier transform for the S1 received signal showing the target energy within a defined window.
Figure 17C:
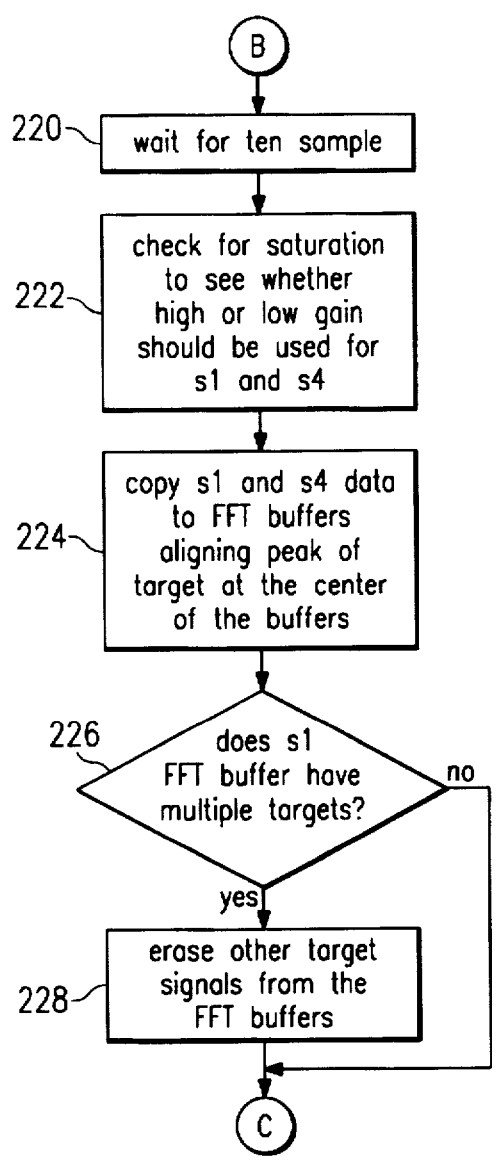

Once the threshold triggering inquiry has been made and it has been determined by the digital signal processor 116 that a valid target has been detected, processing is begun to determine the identity (ID), depth and size of the target. This is described in reference to FIGS. 11, 12, 13, 14, 15, 16 and flow diagram FIGS. 17C, D and E. Referring now to FIG. 17C, in operational block 220 data is collected for another ten samples. Referring to FIG. 11, there is shown a 64 point buffer and a line 221. The ten additional samples moves the buffer forward to line 221 and essentially captures the entirety of the pulse from the target.

Moving to operational block 222, an examination is made to determine whether the high or low gain should be used for the S1 and S4 signal that are stored in the buffers. If any of the high gain signals are saturated, then the low gain signals are used. Otherwise, the high gain amplitude samples are used.

Figure 12:
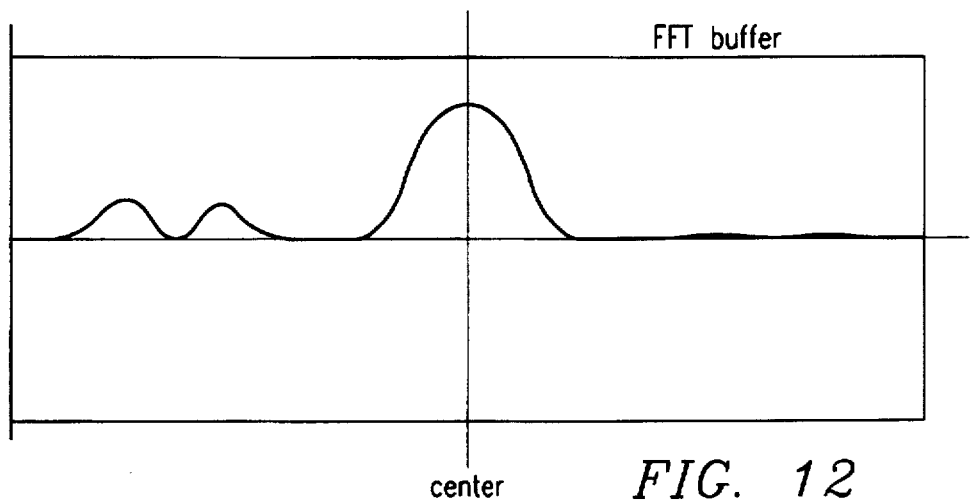
FIG. 12 is an illustration of the signal shown in FIG. 11 with the center of the target pulse aligned at the center of an FFT buffer.

Moving to operational block 224, the S1 and S4 data are copied to FFT buffers as shown in FIG. 12. The peak of the target signal is aligned at the center of the buffer. From the lower right edge of the target signal to the right side of the buffer, a linear approximation of the signal is made.

Moving from operational block 224 to question block 226, an inquiry is made to determine if the S1 signal in the FFT buffer has any multiple targets. Referring to FIG. 12, the two smaller signal pulses to the left constitute such multiple targets. If no such targets exist, the no exit is taken from question block 226 and entry is made to the bubble C. If such targets are present, entry is made to the operational block 228 in which these other targets are erased from the FFT buffer. The removed target signals are replaced with a fixed value so that the target signal is essentially symmetric in the FFT buffer.

The S4 signal in a similar fashion is transferred to an FFT buffer, centered and the extraneous signals extracted so that the S4 signal is ready for Fourier transform processing in the same manner as the S1 signal shown in FIG. 12.

Figure 13:
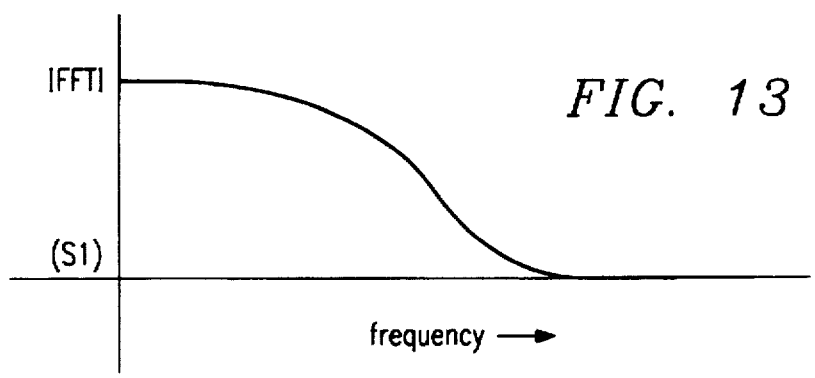
FIG. 13 is an illustration of the magnitude of Fourier transform for the signal shown in FIG. 12.
Figure 14:
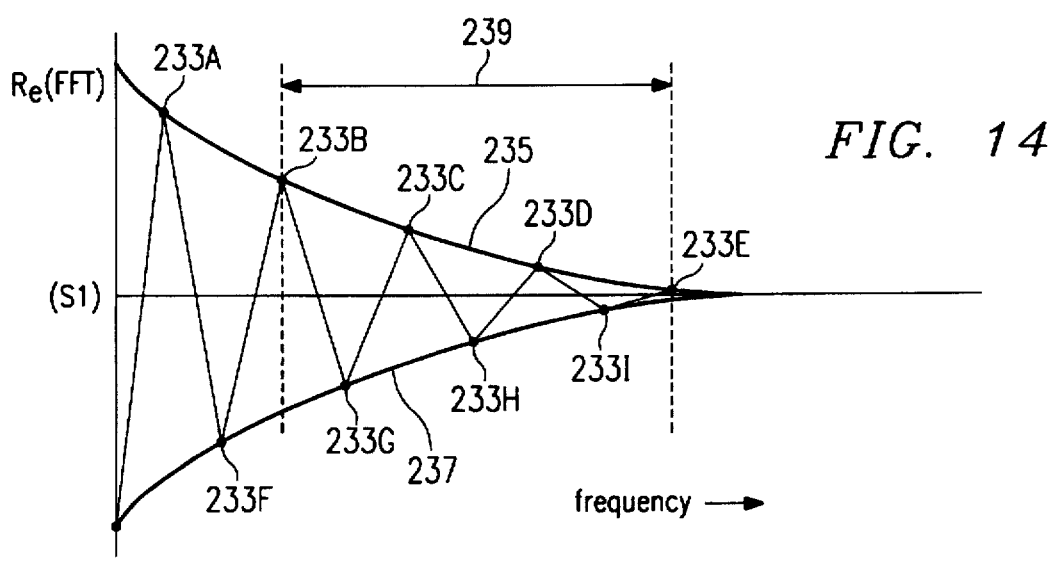
FIG. 14 is an illustration of the real component for the Fourier transform signal shown in FIG. 13.
Figure 17D:
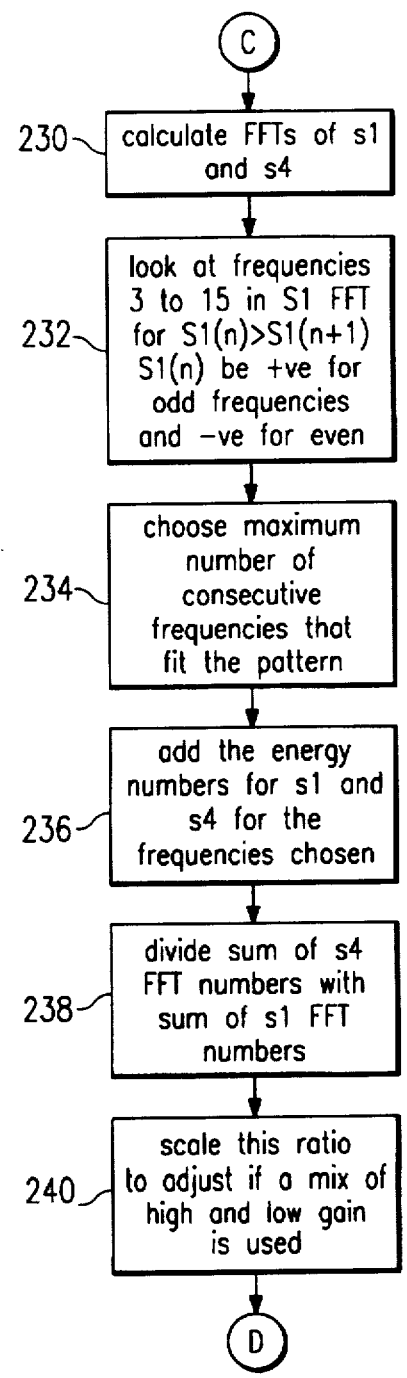
Figures 17E, 17F:
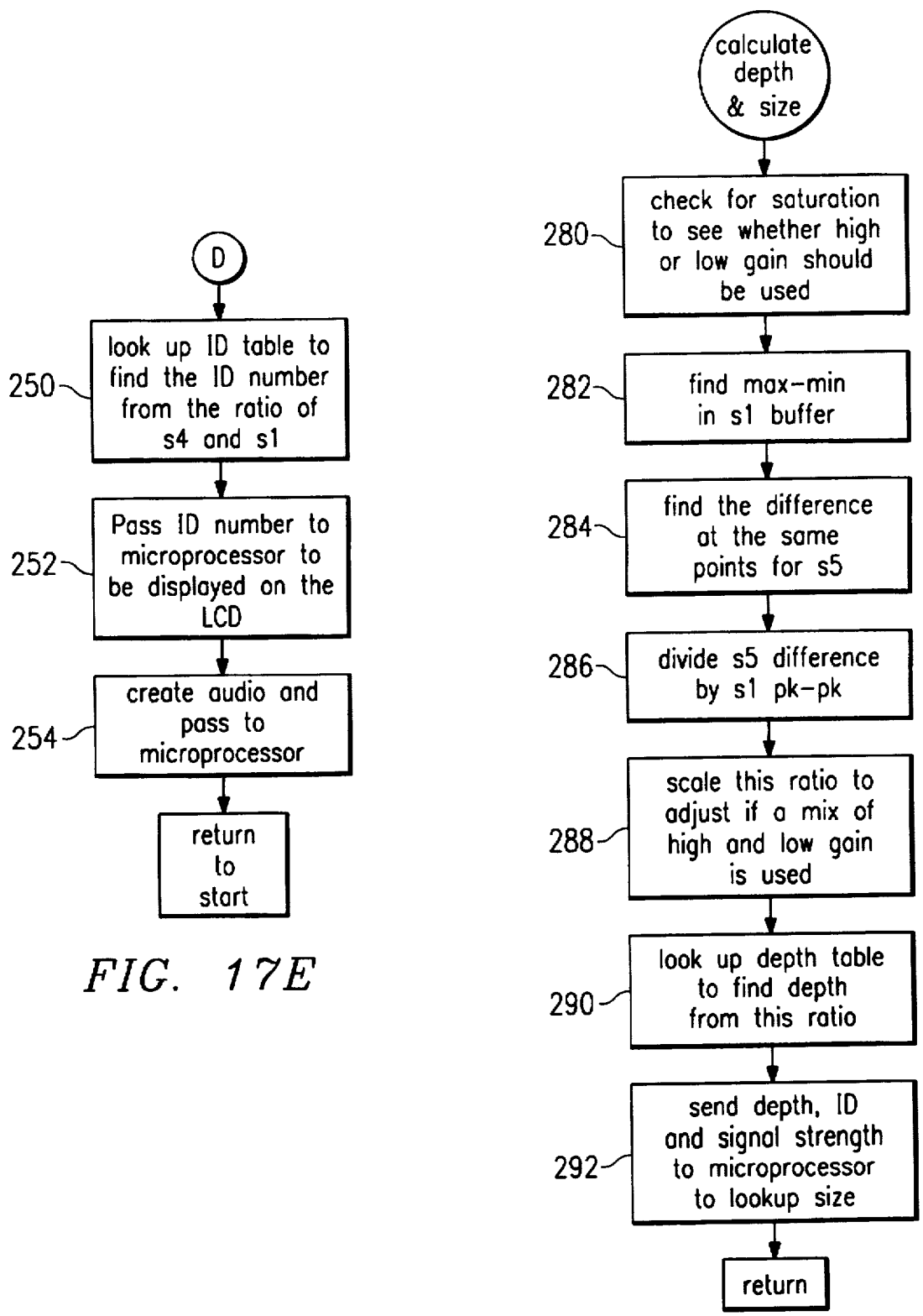

Referring now to FIG. 17D, a calculation is now performed to produce the Fourier transforms for the S1 and S4 signals as shown in operational block 230. Referring to FIG. 13, there is shown the direct Fourier transform of the S1 signal. A similar transform is made for the S4 signal. This signal, however, includes both the real and the imaginary components of the Fourier transform. Because of the symmetry of the target signal in the FFT buffer (FIG. 11), the signal component of interest is the real component. The real component of the Fourier transform shown in FIG. 13 is shown in FIG. 14. This comprises discrete integer frequencies and the data points in FIG. 14 are marked with circles.

The data points 233A, B, C, D and E represent odd frequencies 1, 3, 5, 7 and 9. The data points 233F, 233G, 233H and 233I represent respectively the even integer frequencies 2, 4, 6 and 8. Note also that the positive data points are along an envelope 235 and the even data points are along an envelope 237. These envelopes are monotonically decreasing toward zero.

Referring now to operational block 232 in FIG. 17D, an examination is made for the Fourier transform for the S1 signal as shown in FIG. 14 and for the corresponding S4 signal, which has been processed in the same manner. Only the frequencies in the range of three to fifteen hertz, for the selected embodiment, are examined. Frequencies above fifteen hertz are likely noise, such as strike of the metal detector against an object and frequency components below three hertz are likely due to ground or mineralized soil. A further test is made to determine over what range there is a monotonically deceasing envelope as shown in FIG. 14. A further test is to determine that the odd integer frequencies are positive and the even integer frequencies are negative. This is the condition shown in FIG. 14.

Moving now to operational block 234, an examination is made to determine the maximum frequency range which fits the pattern, that is, the restrictions set forth in operational block 232. This is indicated by the bidirectional arrow which indicates a frequency range 239 and this is a range of approximately three to nine hertz.

Figure 15:
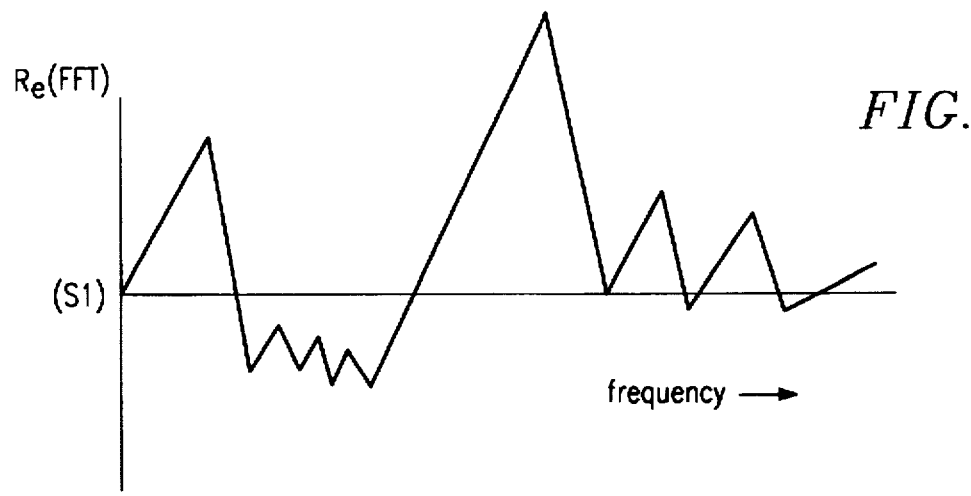
FIG. 15 is an illustration of a sample real component of a Fourier transform for the S1 signal for another sweep of the detector.

FIG. 15 shows a transform signal S1 which does not meet the required characteristics. FIG. 16 shows a transform signal S1 which does have a frequency band which meets the requirements as shown in FIG. 14.

Moving now to operational block 236, shown in FIG. 17D, the energy for the S1 signal in the selected frequency range, shown in FIG. 14, is summed. The frequency range determine for the S1 signal, this is, frequency range 239, is arbitrarily applied to the S4, signal which has been processed in the same manner to produce a similar Fourier transform as shown in FIG. 14. The energy of the integer components in the S4 signal are likewise summed for the frequency range 239.

Operational control is now transferred to block 238 in which the sum of the S4 Fourier components is divided by the sum of the S1 Fourier components to produce a ratio.

Moving from operational block 238 to operational block 240, this ratio is scaled according to the mix of high and low gain signals which were used. The high or low scale factor must be taken into account to produce the correct numerical ratio. Control is then transferred through bubble D to the start of operation shown in FIG. 17E.

In operational block 250, the DSP 116 looks up in an ID table to find the ID number derived from the ratio of the S4 and S1 signals determined in operational block 240. This produces an ID number, that is, an identification for the particular electrical characteristics of the target material.

In operational block 252, the ID number is transferred to the microprocessor for display on the display screen 42. This can indicate, for example, that the target is a coin, pull-tab or other particular type of object.

Transferring now to operational block 254, the DSP 116 produces an audio response appropriate for the identified target and passes this to the microprocessor which in turn causes the audio circuit 122 to produce the particular audio response, such as indicating detection of a desired target or perhaps indicating detection of an undesired target. Further, this can generate a speech signal which can verbally identify the particular target. Circuit 122 produces no audio for an undesired target.

Upon completion of the operations in block 254, control is returned to the start in FIG. 17A.

Previously in reference to FIG. 17B, when the trigger threshold had been achieved, that is, identification of a target signal had been made in question block 196, control is transferred to operational block 198 to calculate the depth and size of the target. This operation is described in reference to FIG. 17F. Entry is first made to an operational block 280. Within this block, the buffers of information for signal S1 and S5 are examined to determine if any of the high amplitude signals are in saturation. If they are in saturation, the low gain signals are used.

In operational block 282, the difference between the minimum and maximum amplitudes of the target signal, such as shown in FIG. 11, is determined for the S1 signal. Referring to FIG. 11, there are two "x" marks which indicate the minimum and maximum values of this signal.

Transferring to operational block 284, a similar determination is made for the signal S5 at the same points in time.

Transferring to operational block 286, the differential signal determined for the S5 signal is divided by the differential signal (peak to peak) for the S1 signal.

Transferring from operational block 286 to operational block 288, this ratio, produced in block 286, is scaled depending upon the high and low gain signals which were used.

Transferring to operational block 290, reference is made to a depth table based on the ratio to determine one of the six possible depths as indicated in FIG. 2 for the display 42. A lower ratio indicates the deeper the target is in the earth From block 290, control is transferred to operational block 292 in which the determined depth, the ID (characteristic) of the target and the signal strength of the target, that is, the amplitude of S5 signal, is transferred to the microprocessor 120 for using the look-up table in FIG. 6 for determining the size of the target. Control is then returned to the start of the DSP processing in FIG. 17A. FIG. 6 gives size as a function of depth and amplitude.

Optionally, in place of using S5 alone as the amplitude signal, a combination of S5 and S1 may be used. This can be a linear combination such as a sum. A further option is S1 alone.

Figures 18A, 18B:
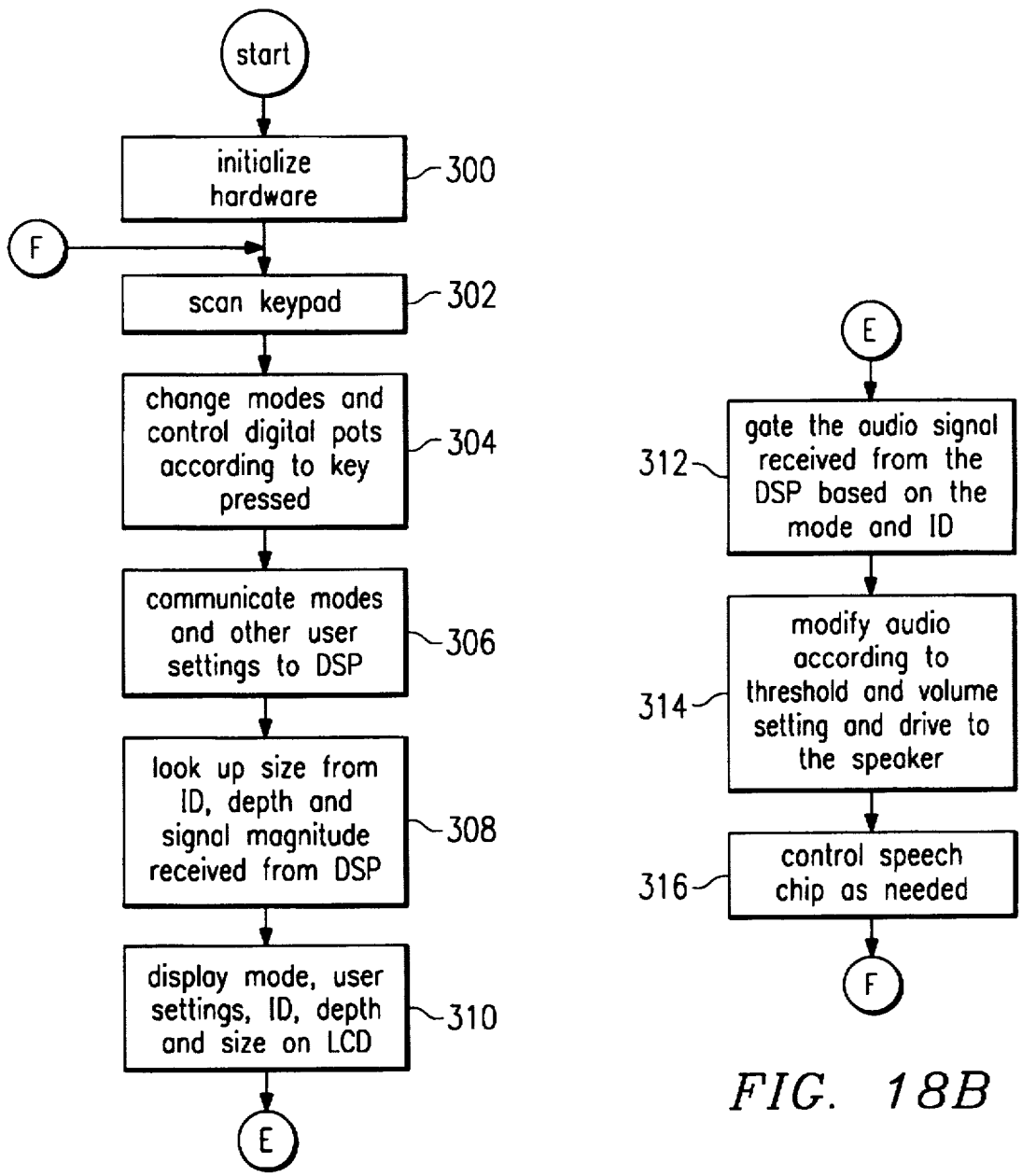

Operation of the microprocessor 120 is described now in reference to FIGS. 18A and 18B. In operational block 300, upon powering up the metal detector 30, the microprocessor initializes the hardware in a conventional fashion.

In the next operational block 302, the microprocessor 120 scans the keypad 44 to detect inputs from the operator. This operation is repeatedly done to determine when the operator makes changes to the operating configuration for the metal detector.

In operational block 304, the inputs from the keyboard are processed and any changes to modes or controls for a digital potentiometers are made according to the keys which have been pressed.

In operational block 306, the modes selected by the user and settings made by the user are transferred to the DSP 116 for its use, as did above, in processing signal information.

In operational block 308, the microprocessor 120 receives the ID calculation made by the digital signal processor, the depth calculation and the measurement of the signal magnitude which all have been made by the DSP 116. By use of this information and reference to the look-up table 150 shown in FIG. 6, which is stored in the microprocessor 120, a determination of the size classification from A through E is made.

In operational block 310, signals are sent by the microprocessor 120 to activate the liquid crystal display 42 for displaying modes and user settings, which have been selected previously by the user, for displaying the ID of the target which has been determined by the digital signal processor 116, the depth which has been determined by the processor 116 and the size which has been determined by the microprocessor 120 in reference to table 150.

In operational block 312, in FIG. 18B, the audio signal identifier received from the digital signal processor 116 is sent to the audio circuit 122 provided that the other information received from the digital signal processor meets the mode and ID requirements which have been set by the user.

In operational block 314, the audio signal is modified according to the threshold and volume settings provided by the operator and then used to drive a speaker.

In operational block 316, a speech chip is activated as needed to produce a speech output if it has been selected by the user, as indicated by the functions available to the operator of the metal detector 30, as shown in FIG. 2. Upon completion of operational block 316, control is transferred back to operational block 302 to again resume scanning the keypad 44 for operator inputs and then sequentially go through the following blocks as described.

The selected embodiment described for the present invention is an inductively balanced detector, but many aspects of the present invention can be used with a pulse detector as well.

Although one embodiment of the invention has been illustrated in the accompanying drawings and described in the foregoing detailed description, it will be understood that the invention is not limited to the embodiment disclosed, but is capable of numerous rearrangements, modifications and substitutions without departing from the scope of the invention.

What we claim is:

1. A method for determining the conductivity of a target detected by a metal detector, comprising the steps of:

transmitting a continuous sinusoidal signal from a transmit coil which is spaced proximate a receive coil that is substantially inductively balanced with said transmit coil, wherein said object causes a signal to be produced in said receive coil when said object is in the vicinity of said transmit and receive coil, receiving and storing at least first and second signals from said receive coil, said first signal comprising a component of said receive signal which is phase offset by a first phase value from the signal in said transmit coil and said second signal comprising a component of said receive signal which is phase offset by a second phase value from the signal in said transmit coil, said stored signals comprising a data set, and said first phase value is different from said second phase value, producing a first Fourier signal derived from the Fourier transform of said first signal, wherein said first Fourier signal includes discrete frequency elements, producing a second Fourier signal derived from the Fourier transform of said second signal, wherein said second Fourier signal includes discrete frequency elements, determining the frequency range in said first Fourier signal which represents a signal component substantially produced by the presence of said target, determining the energy of said first Fourier signal within said frequency range to produce a first energy value and determining the energy of said second Fourier signal within said frequency range to produce a second energy value, and producing a ratio of said first and second energy values wherein said ratio is representative of the conductivity of said target.

2. A method for determining the conductivity of a target as recited in claim 1 wherein said first Fourier signal comprises the real component of the Fourier transform of said first signal and said second Fourier signal comprises the real component of the Fourier transfer of said second signal.

3. A method for determining the conductivity of a target as recited in claim 2 wherein said step of determining the frequency range in said Fourier transform comprises a step of identifying sequential alternate polarity frequency elements which have monotonically decreasing amplitude.

\* \* \* \* \*